(12) United States Patent
Ichikawa et al.

(10) Patent No.: US 7,749,639 B2
(45) Date of Patent: Jul. 6, 2010

(54) GAS DIFFUSION ELECTRODE AND SOLID POLYMER ELECTROLYTE FUEL CELL

(75) Inventors: Satoru Ichikawa, Yokosuka (JP); Masahiro Yamamoto, Hachioji (JP); Norihisa Waki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 785 days.

(21) Appl. No.: 11/571,010

(22) PCT Filed: Jun. 21, 2005

(86) PCT No.: PCT/JP2005/011339
§ 371 (c)(1),
(2), (4) Date: Dec. 20, 2006

(87) PCT Pub. No.: WO2005/124903
PCT Pub. Date: Dec. 29, 2005

(65) Prior Publication Data
US 2008/0299430 A1 Dec. 4, 2008

(30) Foreign Application Priority Data
Jun. 21, 2004 (JP) ............... 2004-182784

(51) Int. Cl.
*H01M 4/86* (2006.01)
*H01M 8/10* (2006.01)
(52) U.S. Cl. ..................... 429/41; 429/30
(58) Field of Classification Search ............ 429/30, 429/41
See application file for complete search history.

(56) References Cited

U.S. PATENT DOCUMENTS

| 5,620,807 | A | 4/1997 | Mussell et al. |
| 6,350,539 | B1* | 2/2002 | Wood et al. ............ 429/34 |
| 2002/0146616 | A1 | 10/2002 | Yasuo et al. |
| 2003/0175581 | A1 | 9/2003 | Kordesch et al. |
| 2004/0045833 | A1 | 3/2004 | Li et al. |

FOREIGN PATENT DOCUMENTS

| JP | 6-65039 B2 | 8/1994 |
| JP | 9-245800 A | 9/1997 |

(Continued)

OTHER PUBLICATIONS

IPLD Machine Translation of JP 2003-059498 (Feb. 2003).*

*Primary Examiner*—Gregg Cantelmo
(74) *Attorney, Agent, or Firm*—Foley & Lardner LLP

(57) ABSTRACT

A gas diffusion electrode includes: an electrode catalyst layer; microporous layers arranged on the electrode catalyst layer and including at least second and first microporous layers, wherein the second microporous layer disposed on the electrode catalyst layer side is composed to have higher water repellency than the first microporous layer; and an oxidant gas diffusion substrate disposed on the microporous layers and formed of carbon fiber. According to the gas diffusion electrode of the present invention, drainability of generated water from the electrode catalyst layer to the gas diffusion layer and moisture retention and gas diffusibility of the electrode catalyst layer can be enhanced. Moreover, according to a solid polymer electrolyte fuel cell of the present invention, stable power generation characteristics can be obtained even under an operating condition with a wide humidity range and current density range.

10 Claims, 8 Drawing Sheets

FOREIGN PATENT DOCUMENTS

| | | |
|---|---|---|
| JP | 2001-93533 A | 4/2001 |
| JP | 2001-216973 A | 8/2001 |
| JP | 2001-338655 A | 12/2001 |
| JP | 2003-59498 A | 2/2003 |
| JP | 2003-109604 A | 4/2003 |
| JP | 2003-217599 A | 7/2003 |

* cited by examiner

GAS DIFFUSION ELECTRODE AND SOLID POLYMER ELECTROLYTE FUEL CELL

TECHNICAL FIELD

The present invention relates to a gas diffusion electrode and a solid polymer electrolyte fuel cell.

BACKGROUND

A fuel cell is a device which directly converts chemical energy owned by fuel into electrical energy without being converted into thermal energy or mechanical energy on the way. The fuel cell has high power generation efficiency, and it is largely expected that the fuel cell will be developed and put into practical use as a power generation device in the next generation.

As a fuel cell mounted on an automobile, a solid polymer electrolyte fuel cell using an ion exchange membrane has attracted attention. Next, a description will be made of basic construction and operation of the solid polymer electrolyte fuel cell.

The solid polymer electrolyte fuel cell is constructed as a complex cell in which a plurality of simplex cells (hereinafter, also referred to as "unit cells") as basic units of power generation are stacked on one another.

Each unit cell is constructed as a membrane electrode assembly (MEA) in which a so-called anode-side gas diffusion electrode is sandwiched on a fuel electrode or positive electrode (hereinafter, also referred to as an "anode") of a solid polymer electrolyte membrane and a so-called cathode-side gas diffusion electrode is sandwiched on an oxidant electrode or negative electrode (hereinafter, also referred to as a "cathode") thereof. On individual outsides of the anode-side electrode and the cathode-side electrode, each unit cell includes an anode-side separator and a cathode-side separator, each of which has a gas flow passage and a coolant flow passage.

The anode-side gas diffusion electrode has an electrode catalyst layer on an outside of the solid polymer electrolyte membrane, and a fuel gas diffusion layer on an outside of the electrode catalyst layer. The cathode-side gas diffusion layer also has an electrode catalyst layer on an outside of the solid polymer electrolyte membrane, and an oxidant gas diffusion layer on an outside of the electrode catalyst layer.

In the solid polymer electrolyte fuel cell, gaseous fuel (hereinafter, also referred to as "fuel gas") containing hydrogen is supplied to the anode, and a gaseous oxidant (hereinafter, referred to as "oxidant gas") containing oxygen is supplied to the cathode. Then, a reaction of the following Expression (1) occurs on the anode-side gas diffusion electrode, and a reaction of the following Expression (2) occurs on the cathode-side gas diffusion electrode.

$$H_2 \rightarrow 2H^+ + 2e^- \quad (1)$$

$$\tfrac{1}{2}O_2 + 2H^+ + 2e^- \rightarrow H_2O + Q \text{ (heat of reaction)} \quad (2)$$

Hence, a reaction of the following Expression (3) apparently progresses in each unit cell of the fuel cell.

$$H_2 + \tfrac{1}{2}O_2 \rightarrow H_2O + Q \quad (3)$$

This reaction involves electromotive force required for a movement of elementary charges ($e^-$), and the electromotive force can be taken out as electrical energy to the outside.

As understood from the Expression (1), protons (hydrogen ions) are generated on the anode-side gas diffusion electrode, and the protons move to the cathode-side gas diffusion electrode while using, as transfer media, proton exchange groups in the solid polymer electrolyte membrane. The proton exchange groups in the solid polymer electrolyte membrane reduce specific resistance thereof when a moisture content of the electrolyte membrane is saturated, and act as proton-conductive electrolytes.

In order to maintain the solid polymer electrolyte membrane in a state of containing the moisture, reaction gas humidified in advance by an appropriate apparatus is supplied to each unit cell. Thus, the moisture of the solid polymer electrolyte membrane is restricted from being evaporated, and the solid polymer electrolyte membrane can be thus prevented from being dried.

As understood from the Expression (2), in the solid polymer electrolyte fuel cell, in the case of generating the power, an oxidation reaction progresses in the electrode catalyst layer of the cathode-side gas diffusion electrode, and at the same time, water is generated. In each unit cell, the water thus generated flows to a downstream side together with the oxidant gas. Therefore, there has been a tendency that there coexist the moisture (water) contained in the oxidant gas in order to humidify the solid polymer electrolyte membrane and the water generated following the power generation reaction and that the moisture retained in a downstream region of each unit cell is increased, and there has been a possibility that the region concerned becomes supersaturated to generate liquid droplets, resulting in inhibition of good diffusion of the oxidant gas.

With regard to the above-described point, it is possible to reduce a total amount of the moisture retained in the downstream region of each unit cell by reducing the moisture for humidifying the supplied oxidant gas. However, in such a case, when power generation efficiency is enhanced by increasing a utilization ratio of the oxidant gas, a large amount of the water is generated in the electrode catalyst layer, and it has been necessary to make contrivance to effectively cope with the generation of the liquid droplets owing to the above-described supersaturation.

As described above, in the cathode-side gas diffusion electrode, it has been desired to rapidly eliminate the water generated following the power generation reaction of each unit cell from the electrode catalyst layer, more preferably, it has been desired to rapidly discharge the generated water from the gas diffusion layer to the gas flow passage, that is, to improve a drainage function.

Each electrode constructing the above-described unit cell forms the gas diffusion layer by a porous carbon material having gas diffusibility and conductivity, and specifically, by carbon cloth, carbon felt, carbon paper, or the like, which is made of carbon fiber, and uses the gas diffusion layer as a charge collector. By forming each gas diffusion layer by the material as described above, the fuel gas and the oxidation gas are supplied successively to the respective electrodes, and such a cell reaction progresses continuously to stabilize the power generation.

Moreover, there is disclosed, as the gas diffusion layer, the one produced in such a manner that, in order to restrict the retention (flooding) of the water, the carbon paper or the carbon cloth as a porous substrate is immersed into a fluid dispersion of polytetrafluoroethylene (hereinafter, referred to as "PTFE") or a copolymer of tetrafluoroethylene and hexafluoropropylene (hereinafter, referred to as "FEP"), followed by drying. However, in the gas diffusion layer produced by this method, though an effect of draining the liquid droplets has been obtained in the inside thereof, it has been difficult to completely drain the water generated in the electrode catalyst layer.

Furthermore, in U.S. Pat. No. 5,620,807, there is disclosed a solid polymer electrolyte fuel cell in which a fuel gas microporous layer and an oxidant gas microporous layer are formed between the anode-side electrode catalyst layer and the fuel gas diffusion layer and between the cathode-side electrode catalyst layer and the oxidant gas diffusion layer, respectively. In this solid polymer electrolyte fuel cell, the microporous layers each of which is formed of at least one layer different in porosity from the fuel gas diffusion layer and the oxidant gas diffusion layer are formed, it is made easy to move the fuel gas and the oxidant gas to the anode-side gas diffusion electrode and the cathode-side gas diffusion electrode, or it is made easy to drain the water generated in the cathode-side gas diffusion electrode to an oxidant gas flow groove in the case of the electrode reaction, and electromotive force in a high current density region is thus enhanced. However, in the solid polymer electrolyte fuel cell with such a construction, it has been impossible to ensure moisture retention in each electrode catalyst layer.

In this connection, as a fuel cell capable of operating even under a low humidification condition by ensuring the moisture retention, in Japanese Patent Unexamined Publication No. 2001-93533, there is disclosed a fuel cell in which a coating layer (hydrophilic layer) including ion exchange resin is formed on the porous substrate of the oxidant gas diffusion layer. However, in this fuel cell, there has been an apprehension that drainability thereof is decreased under a high current density.

Moreover, in Japanese Patent Unexamined Publication No. H9-245800, there is disclosed a fuel cell in which water-repellent carbon layers are formed on both surfaces of a hydrophilic substrate obtained by implementing a hydrophilic treatment for the substrate made of the carbon fiber or the like. According to this fuel cell, compatibility is given to the drainability and water supply ability to an electrolyte layer and the electrode catalyst layer, thus making it possible to enhance gas permeability (diffusibility). However, in this fuel cell, the carbon layers are formed on both surfaces of the hydrophilic substrate. Accordingly, in comparison with the case where the carbon layer is formed only on one surface of the hydrophilic substrate, there has been an apprehension that the gas diffusibility from the gas flow passage to the porous substrate of the gas diffusion layer is deteriorated.

In this connection, fuel cells are disclosed, in each of which the drainability is enhanced by inclining properties of the gas diffusion layer continuously or step by step.

In Japanese Patent Unexamined Publication No. 2003-109604, there is disclosed a fuel cell in which a gas diffusion electrode is constructed, the gas diffusion electrode including a catalyst layer containing catalyst-carrying carbon powder and a polymer electrolyte, a porous substrate supporting the catalyst layer and formed of a carbon material, and a water-repellent imparted to the porous substrate, and an amount of the water-repellent in the porous substrate is changed continuously from a side in contact with the catalyst layer to an opposite side. In this fuel cell, the flooding in the gas diffusion electrode and a decrease of the gas permeability (gas diffusibility), which is caused by the flooding, can be restricted.

Moreover, in Japanese Patent Unexamined Publication No. 2003-59498, there is disclosed a fuel cell formed into a structure in which, in the cathode electrode, the electrode catalyst layer and the gas diffusion layer are provided in order from the electrolyte membrane side, and a generated water adjustment layer (water-repellent layer) containing a water-repellent material on an electrode catalyst layer-side surface of the gas diffusion layer. Furthermore, there is also disclosed a fuel cell in which, in order to prevent a water film from being formed on the electrode catalyst layer-side surface of the generated water adjustment layer, an intermediate layer formed of a water-repellent material and a hydrophilic material is formed between the generated water adjustment layer and the electrode catalyst layer, and a concentration of the water-repellent material of the intermediate layer is decreased from the generated water adjustment layer toward the electrode catalyst layer, and the inclination thereof is thus provided.

BRIEF SUMMARY OF THE INVENTION

However, in the fuel cell of the technology described in Japanese Patent Unexamined Publication No. 2003-109604, the drainability of the generated water is inferior to that of the one having a microporous material, and accordingly, the moisture retention under the low humidification condition has not been sufficient.

Moreover, in the technology described in Japanese Patent Unexamined Publication No. 2003-59498, the intermediate layer in close contact with the electrode catalyst layer is inferior in water repellency to the generated water adjustment layer, and accordingly, the function to drain the generated water from the electrode catalyst layer toward the gas diffusion layer by the water repellency has not worked sufficiently. Therefore, in the case of generating the power under the high humidification condition and a condition of the high current density (for example, a current density of 1 $A/cm^2$ or more) as in an automotive fuel cell, there has been an apprehension that the drainability of the generated water is not sufficient.

In particular, in the case of using the fuel cell as a power source for a mobile unit such as the automobile, it is necessary to install an onboard humidification apparatus for humidifying the fuel gas and the oxidant gas, which are supplied to the anode-side and cathode-side gas diffusion electrodes, respectively, and it is required to operate the fuel cell with low humidification in order to suppress power consumption for the humidification and to save fuel consumption.

In this connection, there is also a method of reducing a humidification amount of the oxidant gas in order to operate the fuel cell with low humidification. However, when the humidification amount of the oxidant gas is reduced too much, there are apprehensions that the solid polymer electrolyte membrane tends to be dried, that power generation performance of the fuel cell is decreased, and that the solid polymer electrolyte membrane is deteriorated. Therefore, it is required to enhance the moisture retention of a portion of the solid polymer electrolyte membrane by preventing the solid polymer electrolyte membrane from being dried even under the low humidification condition.

The present invention has been made in consideration for the above-described problems.

In order to solve the above-described problems, a gas diffusion electrode according to an aspect of the present invention includes: an electrode catalyst layer; microporous layers arranged on the electrode catalyst layer and including at least two layers which are first and second microporous layers formed of materials having different water repellencies, wherein the second microporous layer disposed on the electrode catalyst layer side is composed to have higher water repellency than the first microporous layer; and an oxidant gas diffusion substrate disposed on the microporous layers and made of carbon fiber.

A solid polymer electrolyte fuel cell according to another aspect of the present invention includes: a solid polymer electrolyte membrane; electrode catalyst layers arranged on both surfaces of the solid polymer electrolyte membrane;

microporous layers arranged on one of the surfaces of a gas diffusion electrode and including at least two layers which are first and second microporous layers formed of materials having different water repellencies, wherein the second microporous layer disposed on the electrode catalyst layer side is composed to have higher water repellency than the first microporous layer; and a separator disposed on the other surface of the gas diffusion electrode.

DETAILED DESCRIPTION

A description will be made below of a solid polymer electrolyte fuel cell and a cathode-side gas diffusion electrode according to an embodiment of the present invention with reference to the accompanying drawings.

Figure 1:
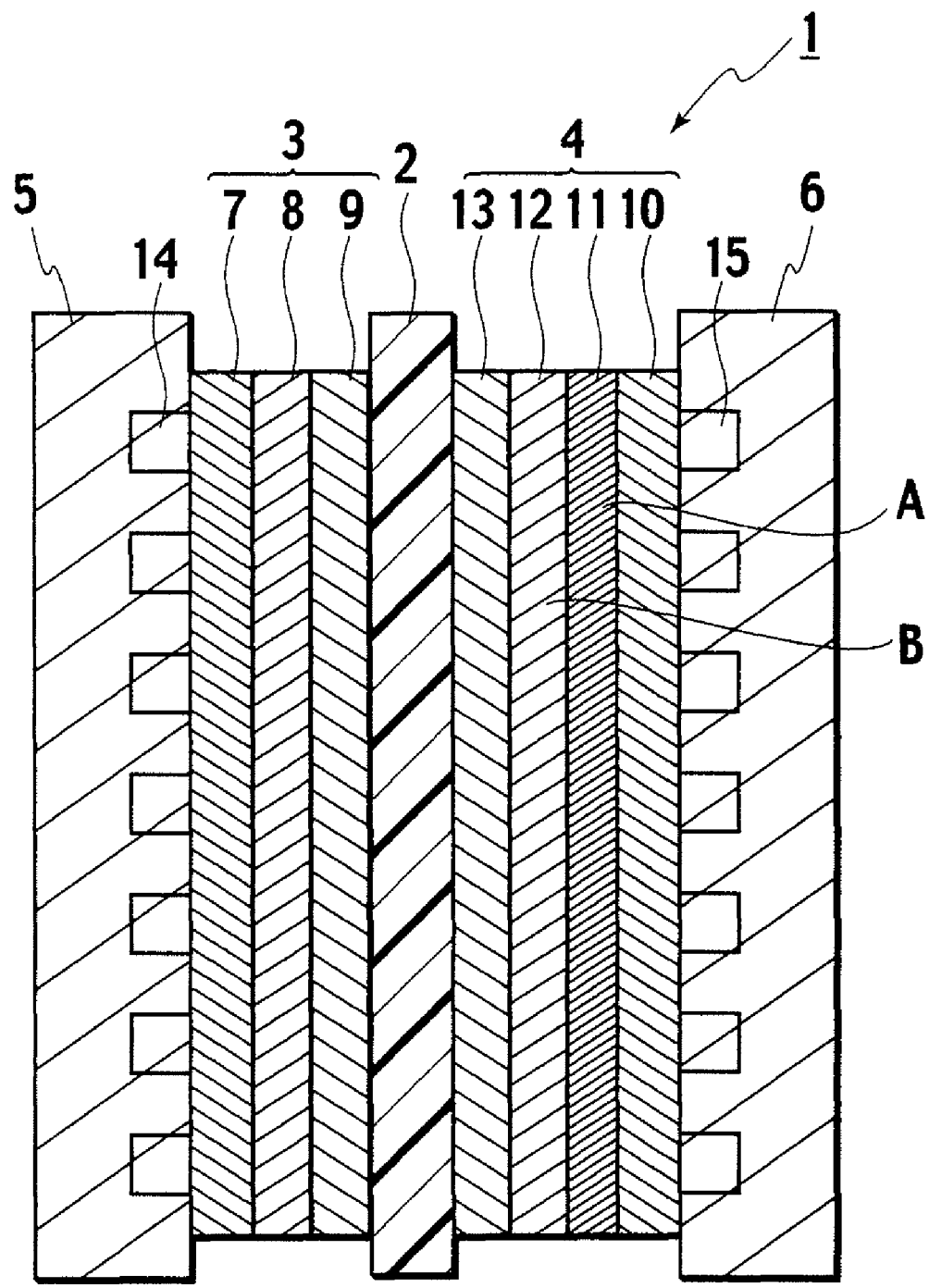
FIG. 1 is a cross-sectional view of a single cell constructing a solid polymer electrolyte fuel cell according to an embodiment of the present invention.

FIG. 1 is a cross-sectional view of a single cell constructing the solid polymer electrolyte fuel cell according to the embodiment of the present invention. A single cell 1 is composed in such a manner that an anode-side gas diffusion electrode 3 and a cathode-side gas diffusion electrode 4 are arranged on both surfaces of a solid polymer membrane 2 and that an anode-side separator 5 and a cathode-side separator 6 are arranged on both surfaces of the joined gas diffusion electrodes 3 and 4.

The anode-side gas diffusion electrode 3 is composed by sequentially stacking a fuel gas diffusion layer substrate 7, a microporous layer 8, and an electrode catalyst layer 9, which are adjacent to the anode-side separator 5. Meanwhile, the cathode-side gas diffusion electrode 4 is composed by sequentially stacking an oxidant gas diffusion layer substrate 10, a first microporous layer 11, a second microporous layer 12, and an electrode catalyst layer 13, which are adjacent to the cathode-side separator 6.

On the anode-side separator 5 on a position side where the fuel gas diffusion layer substrate 7 is disposed, a fuel gas flow passage 14 is formed, and through the fuel gas flow passage 14, fuel gas containing hydrogen is supplied to the anode. Moreover, on the cathode-side separator 6 on a position side where the oxidant gas diffusion layer substrate 10 is disposed, an oxidant gas flow passage 15 is formed, and through the oxidant gas flow passage 15, oxidant gas containing oxygen is supplied to the cathode.

Figure 2:
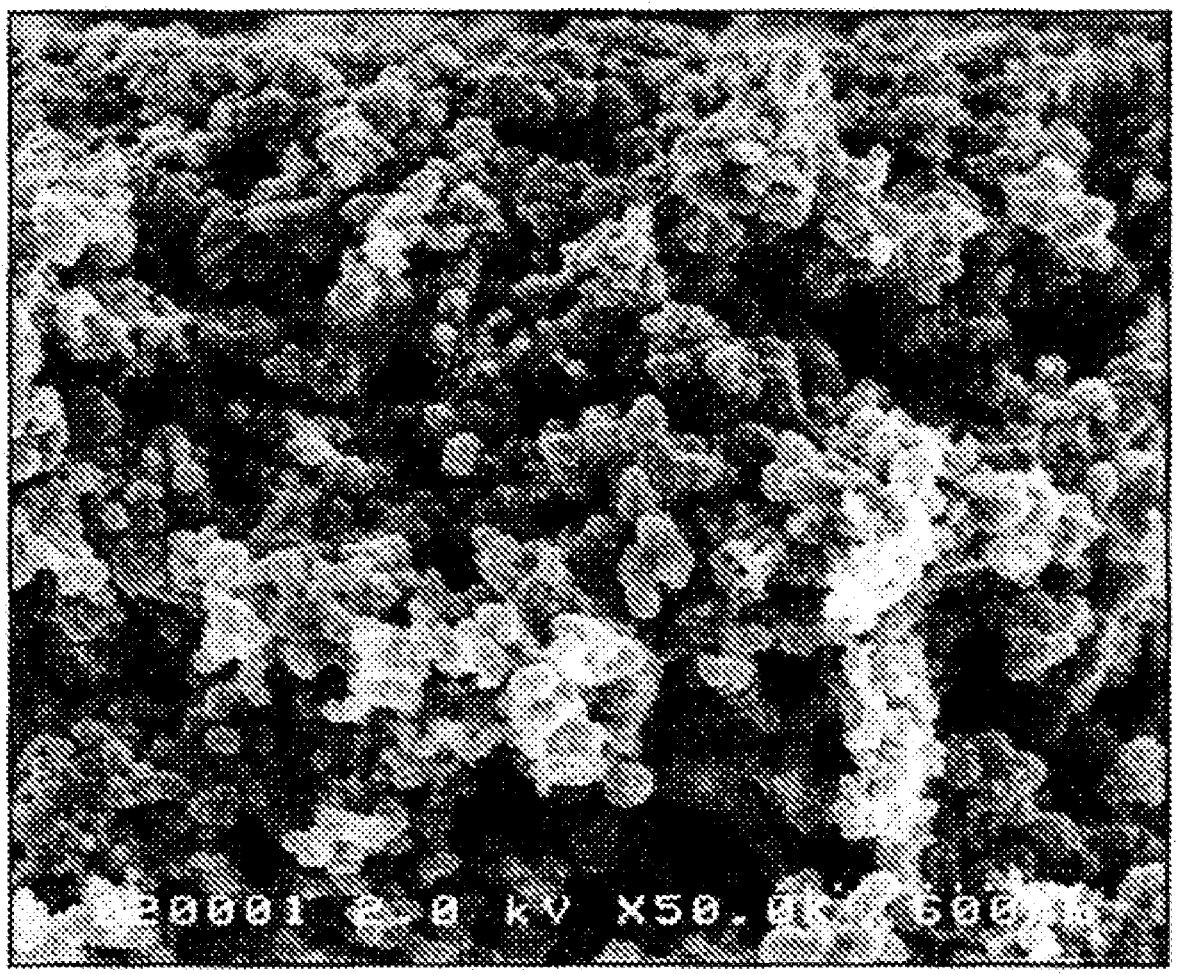
FIG. 2 is an enlarged cross-sectional picture obtained by observing a portion A of a first microporous layer 11 shown in FIG. 1 by a field emission scanning electron microscope.
Figure 3:
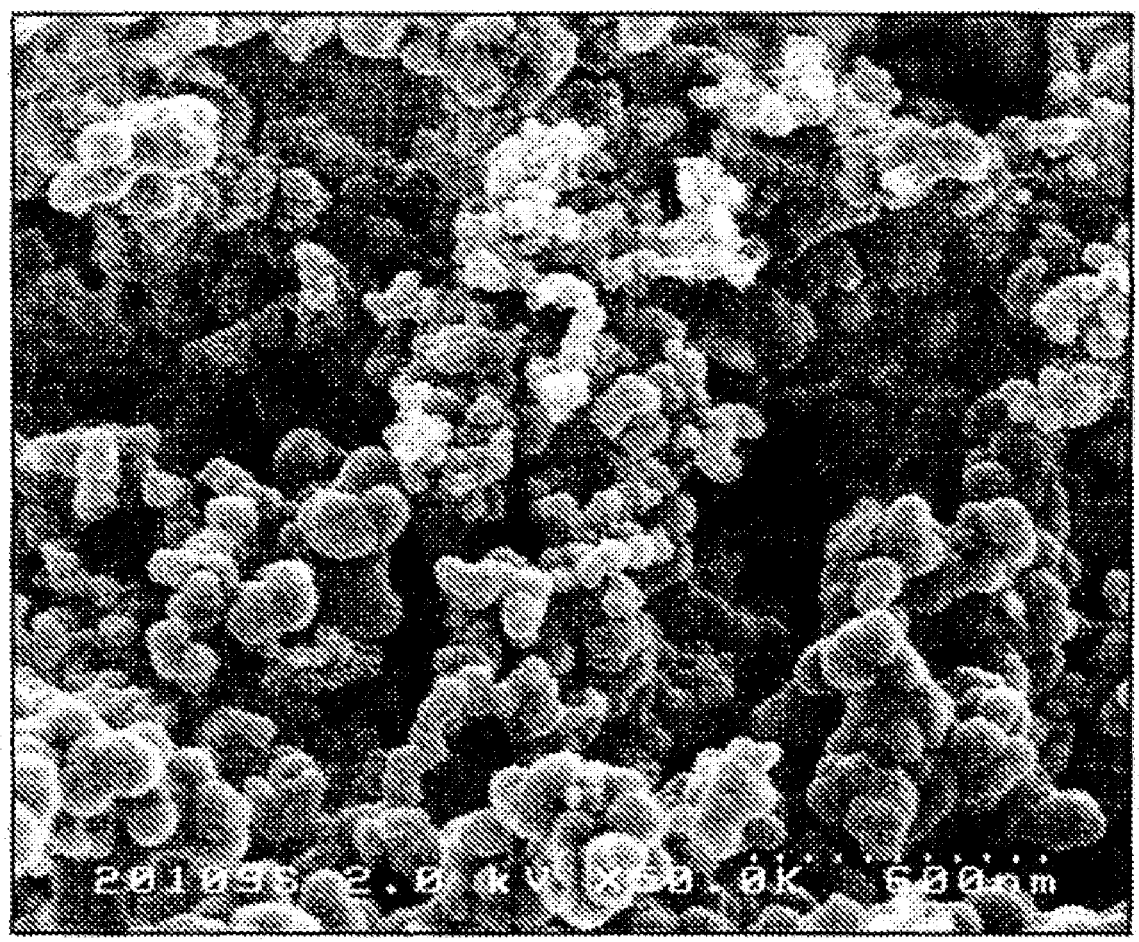
FIG. 3 is an enlarged cross-sectional picture obtained by observing a portion A of a second microporous layer 2 shown in FIG. 1 by the field emission scanning electron microscope.
Figure 4:
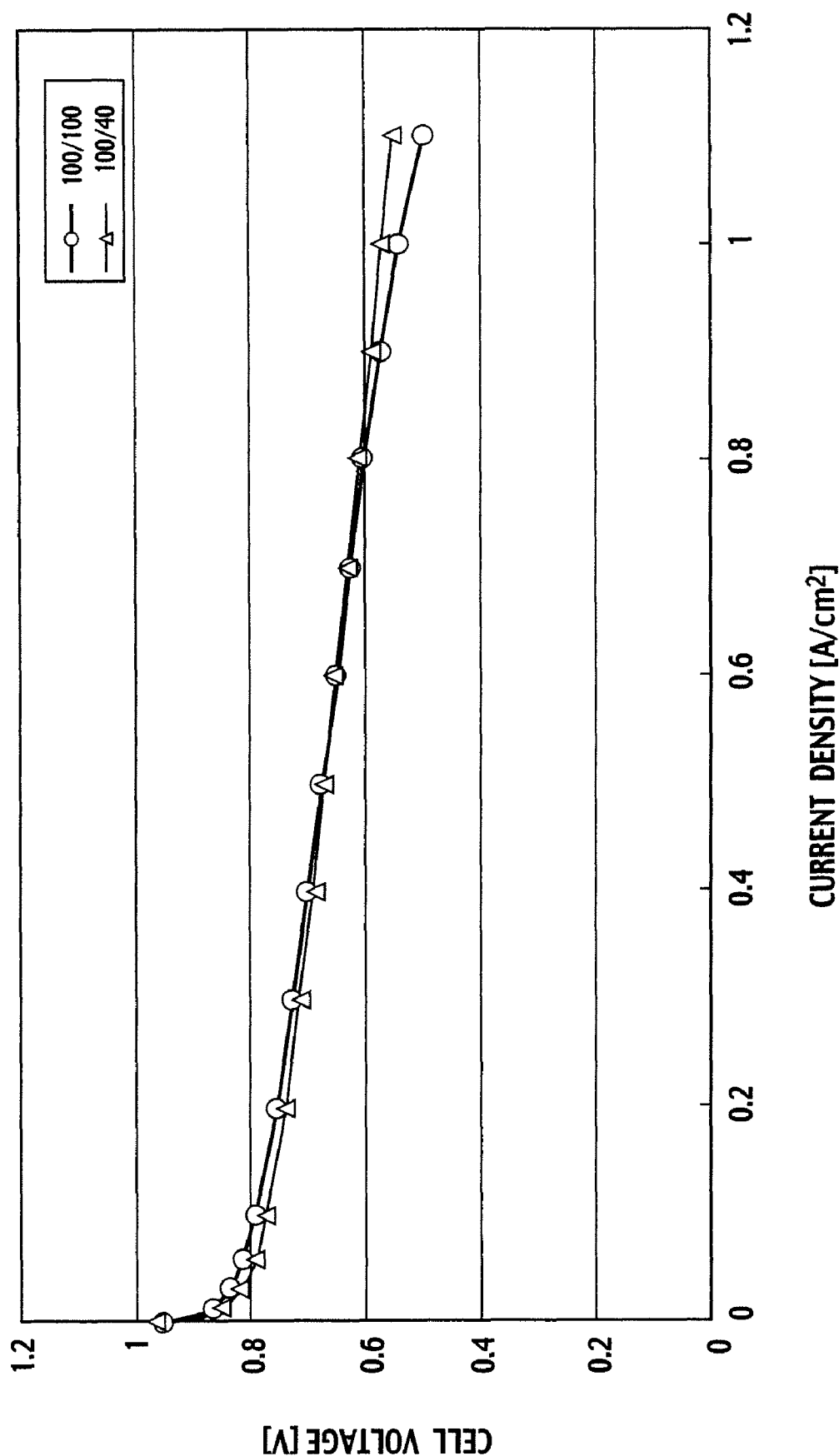
FIG. 4 is a view showing characteristics of cell voltages of Example 1.
Figure 5:
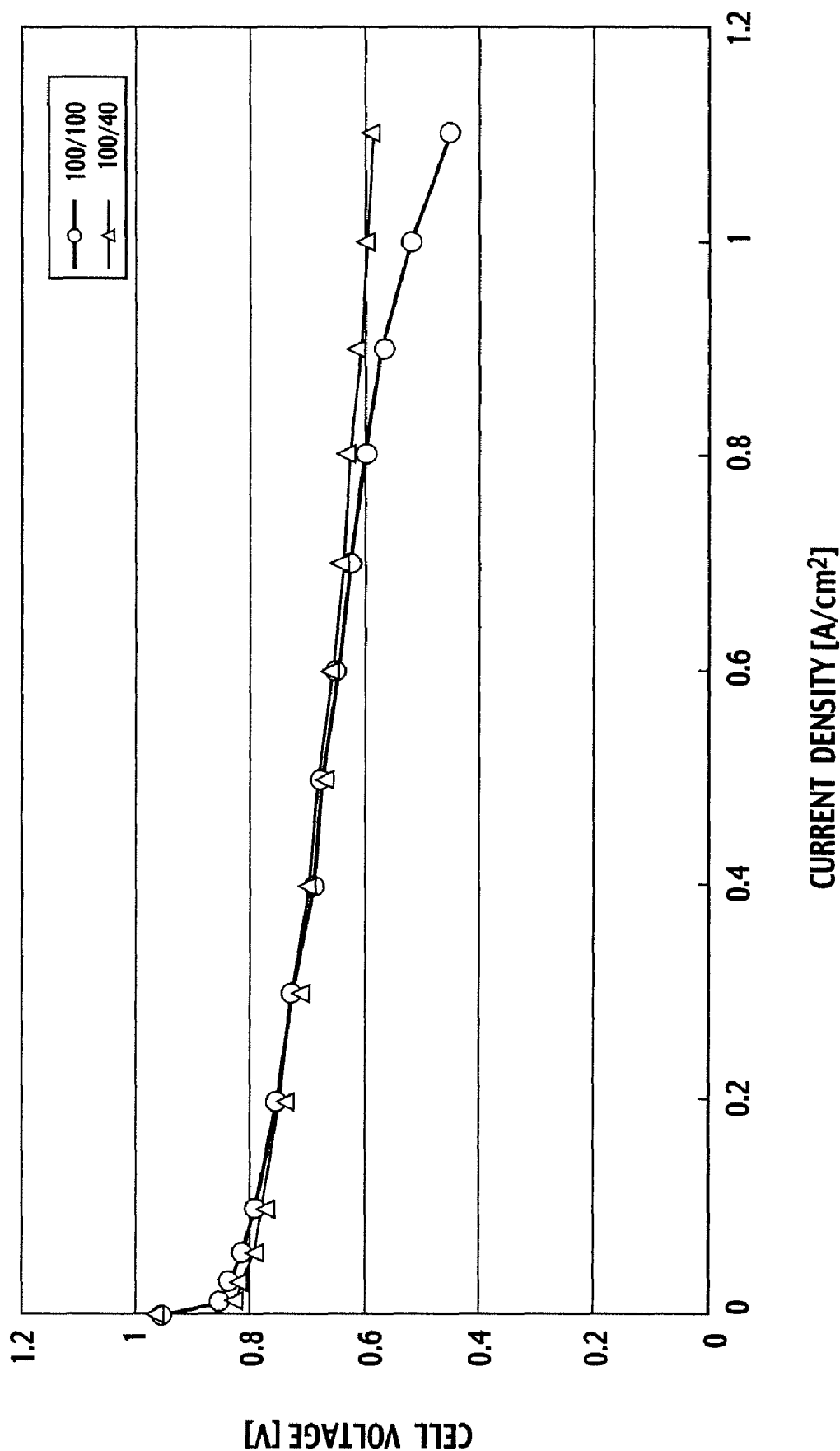
FIG. 5 is a view showing characteristics of cell voltages of Example 2.
Figure 6:
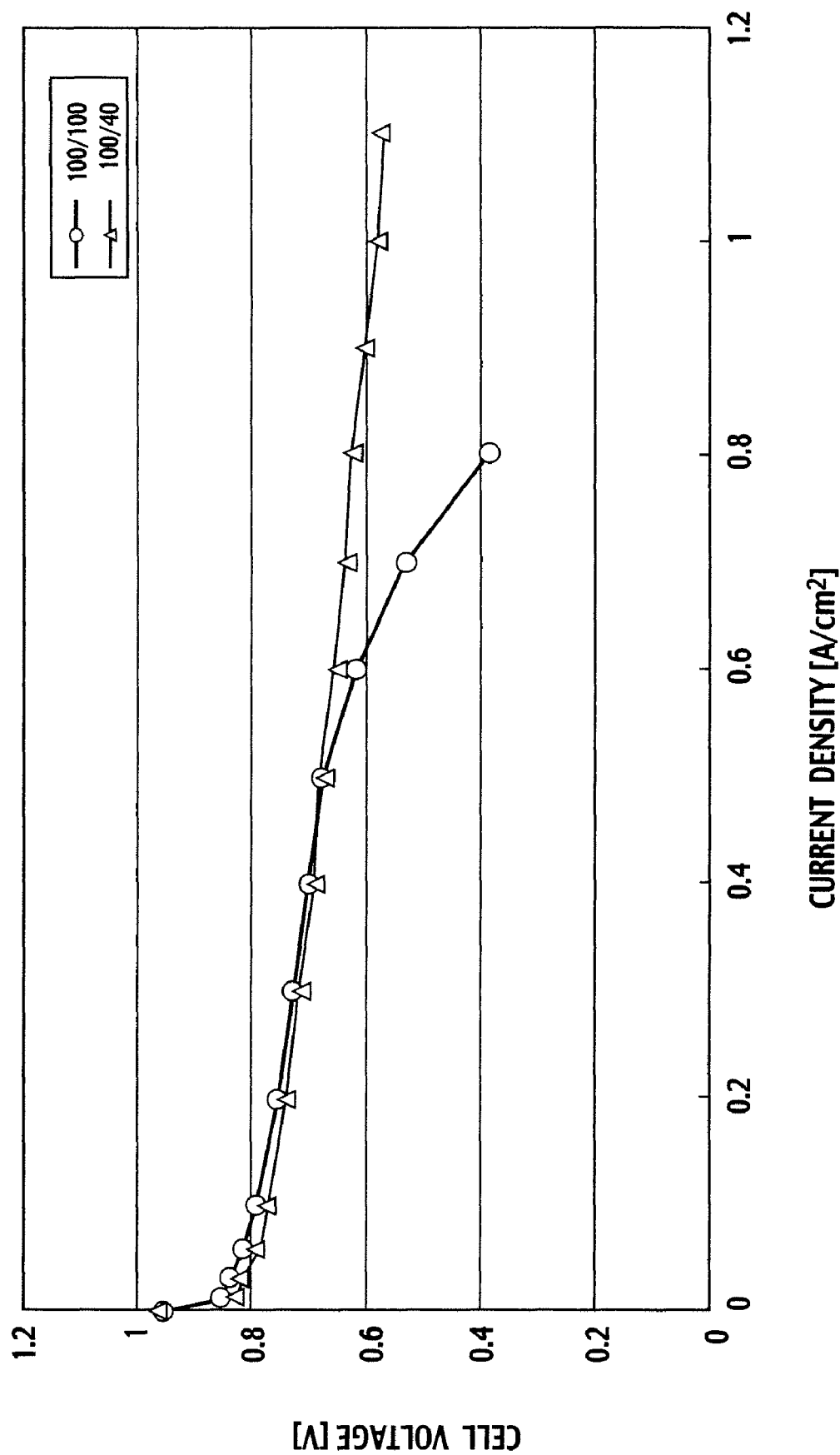
FIG. 6 is a view showing characteristics of cell voltages of Example 3.
Figure 7:
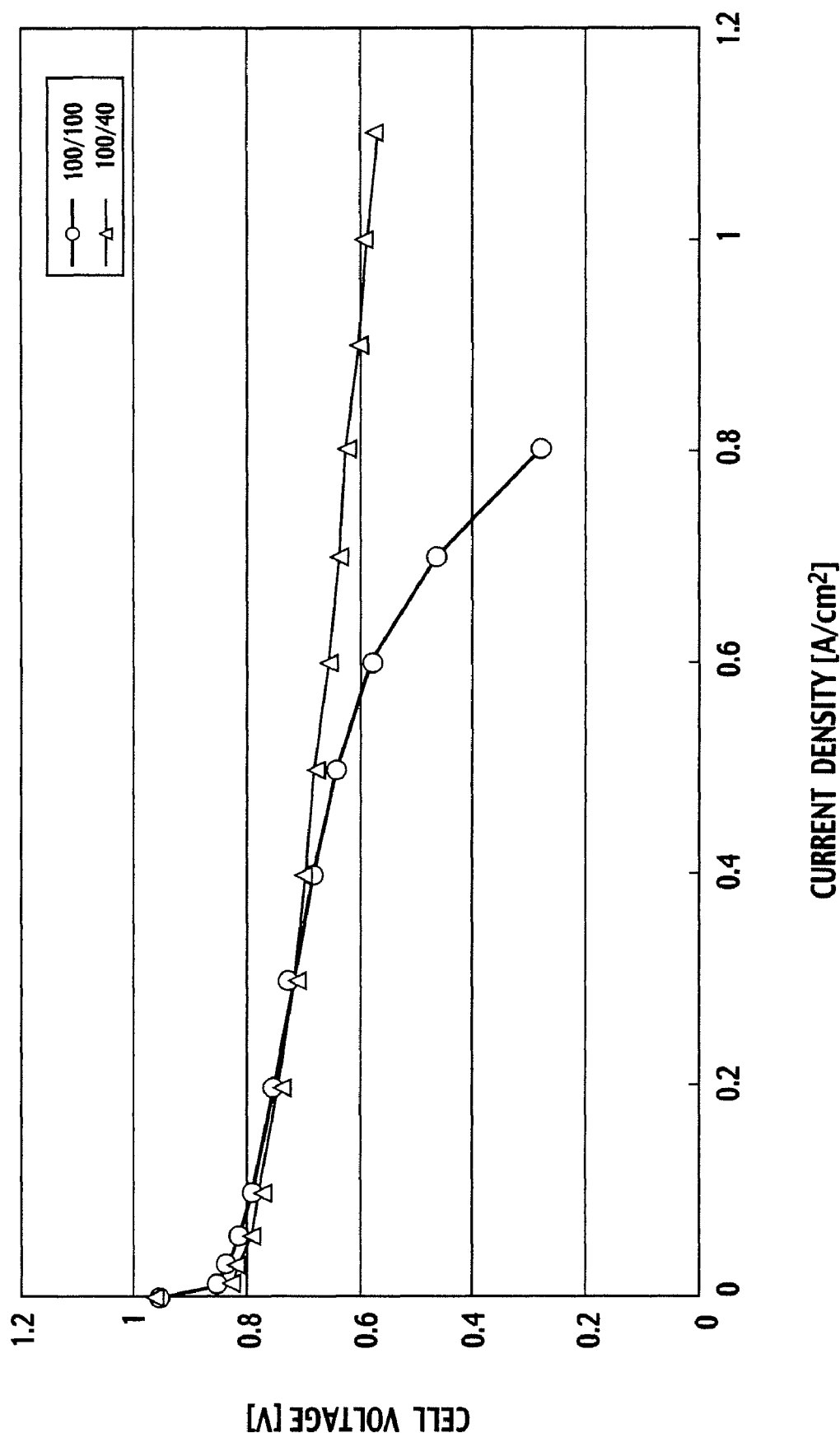
FIG. 7 is a view showing characteristics of cell voltages of Example 4.

The first microporous layer 11 and second microporous layer 12 of the cathode-side gas diffusion electrode 4 are composed of microporous carbon layers having different water repellencies. An enlarged cross-sectional picture of a portion A in the first microporous layer 11 is shown in FIG. 2, and an enlarged cross-sectional picture of a portion B in the second microporous layer 12 is shown in FIG. 3. Note that the respective pictures shown in FIG. 2 and FIG. 3 are obtained by observing the portion A in the first microporous layer 1 and the portion B in the second microporous layer 12 while enlarging the same portions A and B to magnification of 50000 by using a field emission scanning electron microscope ((UHR-FE-SEM) S5000, made by Hitachi, Ltd.) with an acceleration voltage of 2 kV. As shown in the pictures of FIG. 2 and FIG. 3, a mean diameter of pores present in the first microporous layer 11 is made smaller than a mean diameter of pores present in the second microporous layer 12, and water repellency of the second microporous layer 12 is made higher than that of the first microporous layer 11. Therefore, water generated in the electrode catalyst layer 13 is pushed back without being allowed to pass through the second microporous layer 12 having the higher water repellency, and does not flow out from the cathode-side separator 6 side. As a result, the electrode catalyst layer 13 and the solid polymer electrolyte membrane 2 can be prevented from being dried. On the contrary, since water repellency of the first microporous layer 11 is made lower than that of the second microporous layer 12, the generated water is squeezed out to the oxidant gas diffusion layer substrate 10 side and easily drained therefrom even in the case where the generated water enters the microporous layers.

It is preferable that the oxidant gas diffusion layer substrate 10 of the cathode-side gas diffusion electrode 4 be a porous substrate formed of cloth, carbon paper, nonwoven fabric, or the like, which is made of carbon fiber.

Moreover, it is preferable that the mean diameters of the pores present in the above-described microporous layers 11 and 12 be made smaller than a mean diameter of pores present in the porous substrate 10 made of the carbon fiber. The mean diameters of the pores of the microporous layers are differentiated, thus making it possible to easily drain the generated water from the microporous layers 11 and 12 to the porous substrate 10 no matter whether a treatment for the carbon fiber constructing the porous substrate may be a water-repellent treatment or a hydrophilic treatment, or no matter whether the carbon fiber may be hydrophilic or water-repellent.

Preferably, the mean diameters of the pores of the microporous layers 11 and 12 are set at 20 nm to 200 nm, more preferably, at 30 nm to 150 nm. Reasons for the above are as follows. When the mean diameters of the pores of the microporous layers 11 and 12 fall to less than 20 nm, drainability of the water generated in the electrode catalyst layer is entirely decreased, and a difference in drainability between the first microporous layer and the second microporous layer is reduced. On the contrary, when the mean diameters of the pores of the microporous layers 11 and 12 exceed 200 nm, the moisture retention of the electrode catalyst layer cannot be maintained. Hence, by defining the mean diameters of the pores of the microporous layers 11 and 12 within the above-described range, the excessive generated water which is generated in the electrode catalyst layer 13 and enters the pores of the microporous layers 11 and 12 can be rapidly drained from the electrode catalyst layer 13 owing to a capillary phenomenon, and the solid polymer electrolyte membrane 2 can be prevented from being dried.

The above-described microporous layers 11 and 12 are formed of a material containing hydrophilic carbon particles formed of carbon black and a water-repellent resin material. Here, the water repellencies of the microporous layers 11 and 12 are changed by changing contents of the water-repellent resin material in the microporous layers 11 and 12, and for example, it is preferable to set the content of the water-repellent resin material in the fist microporous layer 11 at 5% by weight to 20% by weight, and it is preferable to set the content of the water-repellent material in the second microporous layer 12 at 20% by weight to 50% by weight. As described above, the water repellencies of the microporous layers 11 and 12 are changed by changing the contents of the water-repellent resin by using the same type of carbon particles. Accordingly, either one of the carbon particles used as the microporous layers 11 and 12 does not become corroded, and durability of the microporous layers 11 and 12 is enhanced.

It is preferable to use a fluorine-based resin material as the water-repellent resin material, and in particular, it is preferable to use polytetrafluoroethylene or a copolymer of tetrafluoroethylene and hexafluoropropylene. By using the fluorine-based resin material, the durability of the microporous layers 11 and 12 is enhanced.

Moreover, the above-described microporous layers 11 and 12 can be formed of materials containing carbon particles made of carbon black having different specific surface areas and containing the water-repellent resin (for example, the fluorine-based resin and the like). For example, for the second microporous layer 12, a material containing hydrophobic carbon particles having a small specific surface area can also be used, and for the first microporous layer 11, a material containing hydrophilic carbon particles having a large specific surface area can also be used. As described above, the second microporous layer 12 is formed of the material containing the hydrophobic carbon particles, and a content of such a water-repellent resin composition in the second microporous layer 12 is reduced to the minimum, thus making it possible to reduce an influence given to the durability of the microporous layers 11 and 12, such as creep and mechanical deformation thereof. Moreover, the first microporous layer 11 is formed of the material containing the hydrophilic carbon materials, thus making it possible to retain the moisture on the surfaces of the hydrophilic carbon particles. Accordingly, even under an operating condition with low humidification and a low current density, humidities of the electrode catalyst layer and the solid polymer membrane can be maintained to be high, and the electrode catalyst layer and the solid polymer membrane can be prevented from being dried. Furthermore, with regard to the carbon particles forming the microporous layers, for example, it is preferable to set the specific surface area of the hydrophobic carbon particles at 200 $m^2/g$ or less, and it is preferable to set the specific surface area of the hydrophilic carbon particles at 200 $m^2/g$ or more.

The gas diffusion electrode is formed, in which the microporous layers which are the first microporous layer 11 and the second microporous layer 12 are formed only on the cathode side as one surface of the solid polymer electrolyte membrane, thus making it possible to maintain the water repellencies and the moisture retentions in the microporous layers. Therefore, according to the solid polymer electrolyte fuel cell using the gas diffusion electrode with the above-described construction, even under an operating condition with wide humidity range and current density range, dry out of the solid polymer membrane and flooding can be prevented, and stable power generation performance can be obtained.

Next, a description will be made of more specific examples.

EXAMPLE 1

[Fabrication of CCM]

Catalyst layers were formed on both surfaces of a polymer electrolyte membrane (Nafion 111 membrane, made by United States DuPont Corporation). As a catalyst which forms the catalyst layers, a Pt-carrying carbon catalyst (TEC10E50E) with a carrying amount of 50% was used.

A 5% Nafion solution (prepared by Aldrich Corporation), ultra pure water, IPA, and the Pt-carrying carbon catalyst were mixed together by every predetermined amount, were then agitated and mixed by using a rotary homogenizer, and catalyst ink was thus prepared. Note that the catalyst ink was prepared by the mixing while weighing ionomer and carbon so that weight ratios thereof could be 1.1:1.0.

Next, by using a screen printing method, the prepared catalyst ink was printed on one surface of each of two pieces of sheet-like PTFE so that the Pt-carrying amount could be 0.4 $mg/cm^2$. Then, the catalyst ink thus printed was transferred to the polymer electrolyte membrane (Nafion 111 membrane) by a hot-pressing operation (150° C., 20 $kgf/cm^2$, 5 minutes). Thus, a catalyst coated membrane (CCM) was fabricated.

[Water-Repellent Treatment of Carbon Paper]

Carbon paper (TPG-H-090, made by Toray Industries, Inc.) was immersed into a PTFE-based fluid dispersion (Neoflon, prepared by Daikin Industries, Ltd.) diluted by pure water to have a predetermined concentration, followed by drying.

[Fabrication of Microporous Layers]

First, the PTFE-based fluid dispersion (Neoflon, prepared by Daikin Industries, Ltd.) and carbon black particles (acetylene black: Denka Black AB-6 (specific surface area: 68 $m^2/g$), made by Denki Kagaku Kogyo Kabushiki Kaisha) were dispersively mixed together in a wet process so that a ratio of the PTFE could be 20%. Thus, slurry was prepared. Next, the PTFE-based fluid dispersion (Neoflon, prepared by Daikin Industries, Ltd.) and carbon black particles (Vulcan XC-72R (specific surface area: 254 $m^2/g$), made by Cabot Corporation) were dispersively mixed together in the wet process so that the ratio of the PTFE could be 20%. Thus, slurry was prepared.

Thereafter, on filter paper of which surface is smooth, a solution of Denka Black OAB100 and 20% PTFE was applied, and then water was suction-extracted therefrom. Thereafter, on the filter paper, a solution of Vulcan XC-72R and 20% PTFE was applied, and water was suction-extracted therefrom one more time.

Moreover, by the hot-pressing operation, the slurries were transferred onto the fabricated carbon paper already subjected to the water-repellent treatment, and were dried at room temperature, followed by a heat treatment at 340° C. for 15 minutes. Thus, an MEA was fabricated.

EXAMPLE 2

In Example 2, the fabrication method of the microporous layers was changed. Specifically, first, slurry was prepared, in which the PTFE-based fluid dispersion (prepared by Daikin Industries, Ltd.) and the carbon black particles (acetylene black: Denka Black OAB100, made by Denki Kagaku Kogyo Kabushiki Kaisha) were dispersively mixed together so that the ratio of the PTFE could be 20%. Next, slurry was prepared, in which the PTFE-based fluid dispersion (Daikin Industries, Ltd.) and carbon black particles (Ketjenblack EC (specific surface area: 800 $m^2/g$): carbon black made by Ketjenblack International Corporation) were dispersively mixed together so that the ratio of the PTFE could be 20%.

Thereafter, on the filter paper of which surface is smooth, the solution of Denka Black OAB100 and 20% PTFE was applied, and then water was suction-extracted therefrom. Thereafter, on the filter paper, a solution of Ketjenblack EC and 20% PTFE was applied, and water was suction-extracted therefrom one more time.

Moreover, by the hot-pressing operation, the slurries were transferred onto carbon paper already subjected to the water-repellent treatment, which was fabricated by using a similar method to that of Example 1, and were dried at the room temperature, followed by the heat treatment at 340° C. for 15 minutes. Thus, an MEA was fabricated.

EXAMPLE 3

In Example 3, the fabrication method of the microporous layers was changed. Specifically, first, slurry was prepared, in which the PTFE-based fluid dispersion (prepared by Daikin Industries, Ltd.) and the carbon black particles (Vulcan XC-72R, made by Cabot Corporation) were dispersively mixed together in the wet process so that the ratio of the PTFE could be 20%. Next, slurry was prepared, in which the PTFE-based fluid dispersion (prepared by Daikin Industries, Ltd.) and the carbon black particles (Vulcan XC-72R, made by Cabot Corporation) were dispersively mixed together in the wet process so that the ratio of the PTFE could be 40%.

Thereafter, on the filter paper of which surface is smooth, a solution in which the ratio of the PTFE was 40% was applied, and then water was suction-extracted therefrom. Thereafter, on the filter paper, a solution in which the ratio of the PTFE was 20% was applied, and water was suction-extracted therefrom one more time. Subsequently, by the hot-pressing operation, the slurries were transferred onto the carbon paper already subjected to the water-repellent treatment, which was fabricated by using the similar method to that of Example 1, and were dried at the room temperature, followed by the heat treatment at 340° C. for 15 minutes. Thus, an MEA was fabricated.

EXAMPLE 4

In Example 4, the fabrication method of the microporous layers was changed. Specifically, first, slurry was prepared, in which the PTFE-based fluid dispersion (prepared by Daikin Industries, Ltd.) and the carbon black particles (Vulcan XC-72R, made by Cabot Corporation) were dispersively mixed together so that the ratio of the PTFE could be 20%. Next, slurry was prepared, in which the PTFE-based fluid dispersion (prepared by Daikin Industries, Ltd.) and the carbon black particles (Ketjenblack EC, made by Ketjenblack International Corporation) were dispersively mixed together in the wet process so that the ratio of the PTFE could be 20%.

Thereafter, on the filter paper of which surface is smooth, the solution in which the ratio of the PTFE was 40% was applied, and then water was suction-extracted therefrom. Thereafter, on the filter paper, the solution in which the ratio of the PTFE was 20% was applied, and water was suction-extracted therefrom one more time. Subsequently, by the hot-pressing operation, the slurries were transferred onto the carbon paper already subjected to the water-repellent treatment, which was fabricated by using the similar method to that of Example 1, and were dried at the room temperature, followed by the heat treatment at 340° C. for 15 minutes. Thus, an MEA was fabricated.

COMPARATIVE EXAMPLE 1

[Fabrication of CCM]

Catalyst layers were individually formed on both surfaces of the polymer electrolyte membrane (Nafion 111 membrane, made by US DuPont Corporation). As a catalyst which forms the catalyst layers, the Pt-carrying carbon catalyst (TEC10E50E) with a Pt-carrying amount of 50% was used.

The 5% Nafion solution (prepared by Aldrich Corporation), the ultra pure water, the IPA, and the Pt-carrying carbon catalyst were mixed together by every predetermined amount, were then agitated and mixed by using the rotary homogenizer, and the catalyst ink was thus prepared. Note that the catalyst ink was prepared by the mixing while weighing the ionomer and the carbon so that weight ratios thereof could be 1.1:1.0.

Next, by using the screen printing method, the prepared catalyst ink was printed on both surfaces of the sheet-like PTFE so that the Pt-carrying amount could be 0.4 mg/cm$^2$. Then, the catalyst ink thus printed was transferred to the polymer electrolyte membrane (Nafion 111 membrane) by the hot-pressing operation (150° C., 20 kgf/cm$^2$, 5 minutes). Thus, a catalyst coated membrane (CCM) was fabricated.

[Water-Repellent Treatment of Carbon Paper]

The carbon paper (TPG-H-090, made by Toray Industries, Inc.) was immersed into the PTFE-based fluid dispersion (Neoflon, prepared by Daikin Industries, Ltd.) diluted by the pure water to have the predetermined concentration, followed by drying.

[Fabrication of Microporous Layers]

The carbon black particles (Vulcan XC-72R, made by Cabot Corporation) and the PTFE-based fluid dispersion (Neoflon, prepared by Daikin Industries, Ltd.) were dispersively mixed together in the wet process. Thus, slurry was prepared. The prepared slurry was applied to the filter paper of which surface is smooth, and then water was suction-extracted therefrom. Thereafter, by the hot-pressing operation, the slurry was transferred onto the carbon paper subjected to the water-repellent treatment. Subsequently, the slurry was dried at the room temperature, followed by the heat treatment at 340° C. for 15 minutes. Thus, an MEA was fabricated.

For the MEAs obtained from Examples 1 to 4 and Comparative example 1, which are described above, current-voltage (I-V) characteristics were measured. Note that the current-voltage (I-V) characteristics of the MEAs were measured by using the CCMs fabricated using the above-described production methods and a GDL and by assembling the MEAs to a cell voltage characteristics measuring jig under conditions where the anode and the cathode corresponded to the hydrogen and the air, respectively, a cell temperature was 70° C., a relative humidity of the anode was 100 RH %, and a relative humidity of the cathode was 40 RH % and 100 RH %. Measurement results of the current-voltage characteristics of the respective MEAs for Examples and Comparative example are shown in FIG. 4 to FIG. 8.

Moreover, resistance values of the cells, which were measured under conditions where the humidification was low (relative humidity of cathode: 40 RH %) and the current density was low (current density: 0.4 A/cm$^2$), are shown in Table 1.

TABLE 1

| | Resistance value of cell [mΩ · cm²] |
|---|---|
| Example 1 | 131 |
| Example 2 | 117 |
| Example 3 | 121 |
| Example 4 | 103 |
| Comparative Example | 110 |

Figure 8:
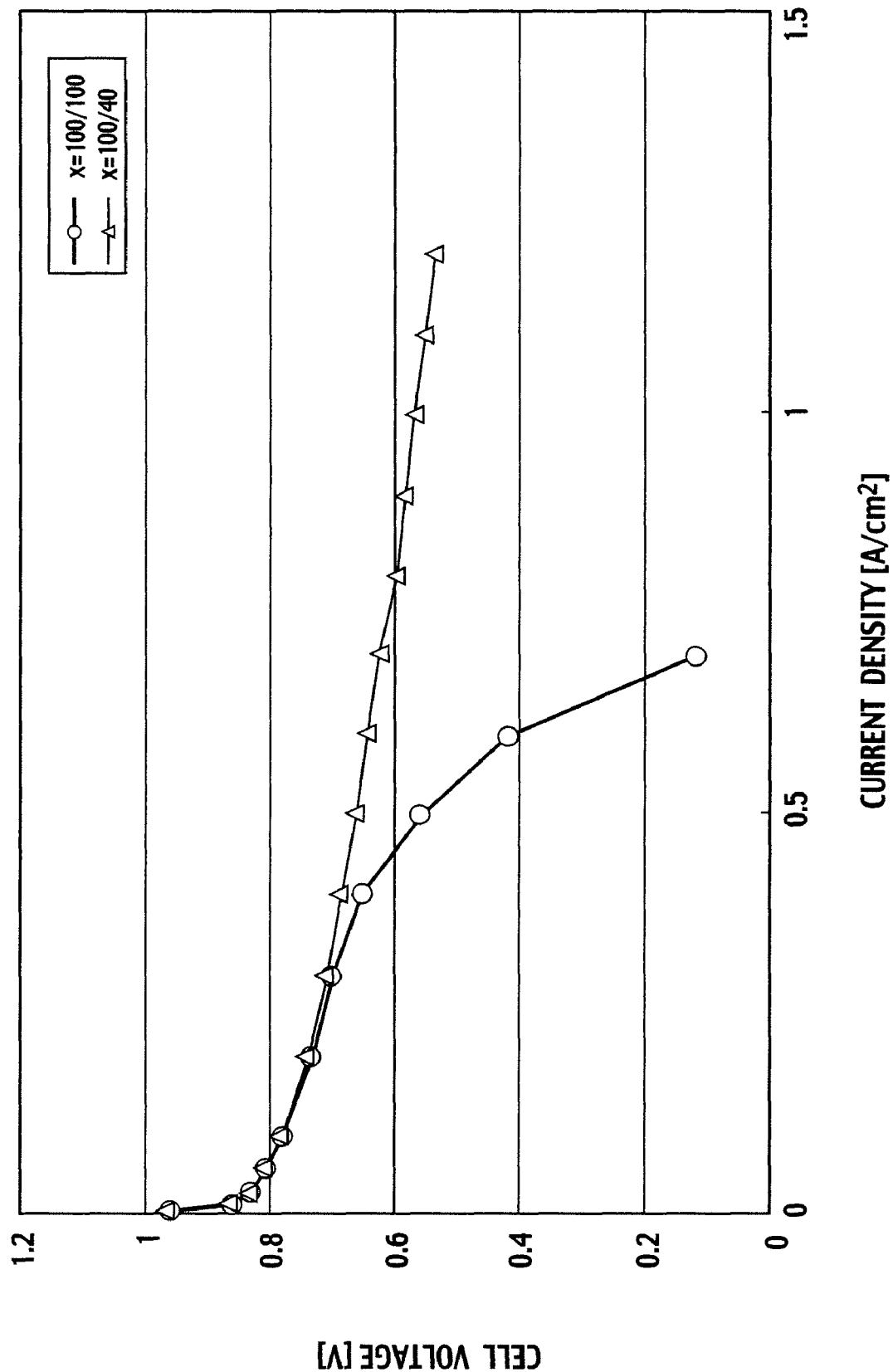
FIG. 8 is a view showing characteristics of cell voltages of Comparative example.

As a result of evaluating the characteristics of the respective cases, as shown in FIG. 8, it was proven that the cell voltage in the high current range was decreased under the condition where the humidification was high, and that the drainability and the gas diffusibility under the operation where the current density was high were decreased in the cathode. As opposed to this, in Example 1 to Example 4, which are shown in FIG. 4 to FIG. 7, it was possible to restrict the decrease of the cell voltage in the high current range even under the condition where the humidification was high. As a result, it was proven that the drainability and the gas diffusibility under the operation where the current density was high were enhanced in the cathode, thus making it possible to prevent the flooding in the high current range even under the condition where the humidification was high. Moreover, it was proven that, by adopting the respective constructions from Example 1 to Example 4, the moisture retention was enhanced, thus making it possible to prevent the solid polymer membrane from being dried even in the case of performing the operation where the humidification was low.

This application claims priority based on Japanese Patent Application No. 2004-182784 filed on Jun. 21, 2004, of which contents are incorporated herein by reference.

While the preferred embodiments of the present invention have been illustrated above, the present invention is not limited to these embodiments. It will be apparent for those skilled in the art that other various embodiments or various modifications may be contrived within the scope of claims, which is shown next.

INDUSTRIAL APPLICABILITY

The gas diffusion electrode according to the present invention enhances the drainability of the generated water from the electrode catalyst layer to the gas diffusion layer, and the moisture retention and gas diffusibility of the electrode catalyst layer, and imparts the stable power generation characteristics to the fuel cell. Moreover, the solid polymer electrolyte fuel cell according to the present invention is good in terms of the drainability of the generated water and the moisture retention and gas diffusibility of the electrode catalyst layer even under the operating conditions where the humidification is low and high and the current density is low and high, and imparts thereto the stable power generation characteristics over the wide humidity range and current density range. Industrial applicabilities of both are high.

The invention claimed is:

1. A gas diffusion electrode, comprising:
an electrode catalyst layer;
microporous layers arranged on the electrode catalyst layer, the microporous layers including at least first and second microporous layers formed of materials having different water repellencies, wherein the second microporous layer disposed on the electrode catalyst layer side is composed to have higher water repellency than the first microporous layer; and
an oxidant gas diffusion substrate disposed on the first microporous layer and formed of carbon fiber.

2. A gas diffusion electrode according to claim 1, wherein a mean diameter of pores present in the microporous layers is 20 nm to 200 nm, and the mean diameter of the pores present in the microporous layers is smaller than a mean diameter of pores present in the oxidant gas diffusion substrate.

3. A gas diffusion electrode according to claim 1, wherein the microporous layers are formed of a material containing carbon particles and water-repellent resin, wherein a content of the water-repellent resin contained in the second microporous layer is 20% by weight to 50% by weight, and wherein a content of the water-repellent resin contained in the first microporous layer is 5% by weight to 20% by weight.

4. A gas diffusion electrode according to claim 1, wherein the microporous layers are formed of a material containing carbon particles and water-repellent resin, wherein the second microporous layer is formed of a material containing hydrophobic carbon particles, and wherein the first microporous layer is formed of a material containing hydrophilic carbon particles.

5. A gas diffusion electrode according to claim 4, wherein a specific surface area of the hydrophobic carbon particles is 200 m²/ g or less, and wherein a specific surface area of the hydrophilic carbon particles is 200 m²/ g or more.

6. A gas diffusion electrode according to claim 3, wherein the water-repellent resin is a fluorine-based resin of polytetrafluoroethylene or a copolymer of tetrafluoroethylene and hexafluoropropylene.

7. A solid polymer electrolyte fuel cell, comprising:
a solid polymer electrolyte membrane;
electrode catalyst layers arranged on both surfaces of the solid polymer electrolyte membrane;
microporous layers arranged on one of the electrode catalyst layers, the microporous layers including at least first and second microporous layers formed of materials having different water repellencies, wherein the second microporous layer disposed on the one of the electrode catalyst layers side is composed to have higher water repellency than the first microporous layer;
an oxidant gas diffusion substrate disposed on the first microporous layer and formed of carbon fiber; and
a separator disposed on a surface of the oxidant gas diffusion substrate.

8. A gas diffusion electrode according to claim 2, wherein the microporous layers are formed of a material containing carbon particles and water-repellent resin, wherein a content of the water-repellent resin contained in the second microporous layer is 20% by weight to 50% by weight, and wherein a content of the water-repellent resin contained in the first microporous layer is 5% by weight to 20% by weight.

9. A gas diffusion electrode according to claim 2, wherein the microporous layers are formed of a material containing carbon particles and water-repellent resin, wherein the second microporous layer is formed of a material containing hydrophobic carbon particles, and wherein the first microporous layer is formed of a material containing hydrophilic carbon particles.

10. A gas diffusion electrode according to claim 4, wherein the water-repellent resin is a fluorine-based resin of polytetrafluoroethylene or a copolymer of tetrafluoroethylene and hexafluoropropylene.

\* \* \* \* \*